T. A. GANNON.
NUT LOCKING DEVICE.
APPLICATION FILED MAR. 23, 1921.

1,403,312. Patented Jan. 10, 1922.

Timothy Aloysius Gannon
INVENTOR.

David J. Kelley, Witness

UNITED STATES PATENT OFFICE.

TIMOTHY ALOYSIUS GANNON, OF SOMERVILLE, MASSACHUSETTS.

NUT-LOCKING DEVICE.

1,403,312.            Specification of Letters Patent.      Patented Jan. 10, 1922.

Application filed March 23, 1921. Serial No. 454,704.

*To all whom it may concern:*

Be it known that I, TIMOTHY ALOYSIUS GANNON, a citizen of the United States, residing at 138 Sycamore Street, Somerville, in the county of Middlesex and State of Massachusetts, have invented a new and useful Nut-Locking Device, of which the following is a specification.

My invention relates to improvements in nut-locks in which a split-ring of spring material operates in conjunction with bolt on which it is affixed: and the objects of my improvement are, first, to provide a means of preventing a nut from loosening or becoming unscrewed after it has been adjusted; second, to provide a means of locking a nut without injuring nut or bolt; and, third, to provide a nut-lock that may be readily attached or detached.

I attain these objects by the mechanism illustrated in the accompanying drawing, in which—

Figure 1:
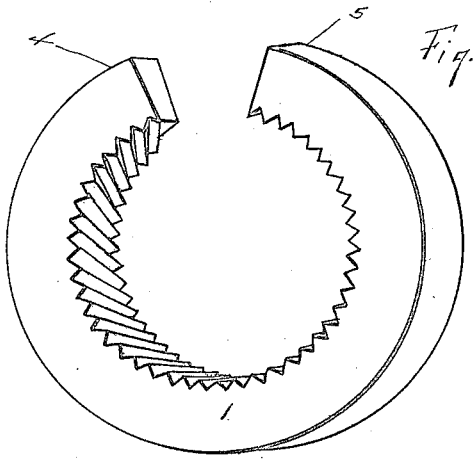
Figure 2:
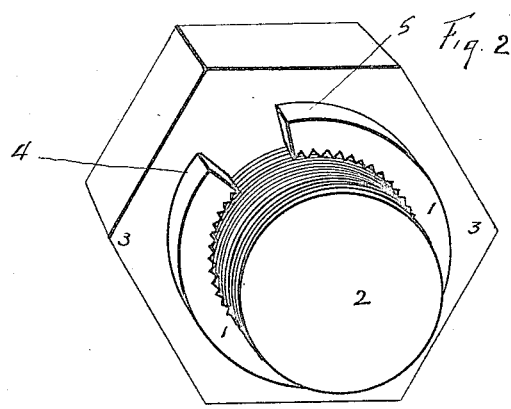

Figure 1 is a view in perspective of the entire device; Figure 2 a view perspective of device as it appears adjusted in working position on bolt.

Similar numerals refer to similar parts throughout the several views.

The split-ring (1) being constructed of spring material and having a series of grooves running diagonally across its inner surface (as shown in Fig. 1.) constitutes the entire device.

The method of applying my improvement is as follows:

The split-ring (1) is sprung apart at its ends (4—5) which causes the diameter of split-ring (1) to be enlarged and admits of its being passed over projecting end of bolt (2) and thence along bolt (2) and placed close against side of nut (3) which has been adjusted on bolt (2). The ends (4—5) of split-ring (1) are then allowed to spring back into normal position causing the series of sharp projecting edges (produced on inner surface of split-ring (1) by the diagonal grooves, before mentioned) to be brought in contact with, and to grip the threaded surface of bolt (2), thus causing split-ring (1) to become rigid on bolt (2) and thereby prevent nut (3) from becoming unscrewed.

The grooves and edges on inner surface of split-ring (1) are made to run diagonally across inner surface of split-ring (1) in order that they may resist any pressure on split-ring (1) which would tend to revolve it on bolt (2) or to slide it along bolt (2).

I am aware that prior to my invention, nut-locks have been made in which a split-ring of spring material has been used, I therefore do not claim such a combination broadly: but

I claim—

In a nut-lock, a split-ring of spring material having its inner surface provided with a series of sharp projecting ridges extending diagonally across said inner surface, said sharp projecting ridges adapted to grip the ridge of threaded surface of bolt on which it is affixed.

TIMOTHY ALOYSIUS GANNON.